United States Patent [19]

Taniguchi et al.

[11] Patent Number: 4,590,117
[45] Date of Patent: May 20, 1986

[54] TRANSPARENT MATERIAL HAVING ANTIREFLECTIVE COATING

[75] Inventors: Takashi Taniguchi, Shiga; Jiro Mibae, Otsu, both of Japan

[73] Assignee: Toray Industries, Inc., Tokyo, Japan

[21] Appl. No.: 722,760

[22] Filed: Apr. 15, 1985

Related U.S. Application Data

[63] Continuation of Ser. No. 474,741, Mar. 10, 1983.

[51] Int. Cl.⁴ .............................. G02B 1/10; B32B 7/02
[52] U.S. Cl. ...................................... 428/212; 350/164; 350/165
[58] Field of Search .................. 428/212; 350/164, 165

[56] References Cited

U.S. PATENT DOCUMENTS 3,432,225  3/1969  Rock ..................................... 350/164
4,361,598  11/1982  Yoldas ............................ 427/164 X Primary Examiner—James R. Hoffman
Attorney, Agent, or Firm—Austin R. Miller

[57] ABSTRACT

A transparent material having an antireflective coating comprising at least two layers, an inner layer containing a compound of Ti, Al or Zi, and an outer layer containing an organic silicon compound. The thickness and refractive index of the layer (layer I) contiguous to the substrate and the thickness and refractive index of the outermost layer (layer O) satisfy the following requirements:

$$\frac{l}{4} \lambda \times 0.7 < n_I d_I < \frac{l}{4} \lambda \times 1.3,$$

and $$\frac{m}{4} \lambda \times 0.7 < n_O d_O < \frac{m}{4} \lambda \times 1.3$$

wherein $n_I$ is the refractive index of layer I, $n_O$ is the refractive index of layer O, $d_I$ is the film thickness (nm) of layer I, $d_O$ is the film thickness (nm) of layer O, l is a positive integer, m is an off positive integer and λ is an optional standard wavelength (nm) selected within the visible ray wavelength region or in the vicinity thereof.

15 Claims, 2 Drawing Figures

TRANSPARENT MATERIAL HAVING ANTIREFLECTIVE COATING

This application is a continuation of application Ser. No. 474,741 filed 3.10.83.

BACKGROUND OF THE INVENTION (1) Field of the Invention

The present invention relates to an antireflective coating which can easily be formed and which is excellent in durability, heat resistance and impact resistance and has a good dyestuff permeability, and also to a transparent material having an excellent antireflective property, which has this antireflective coating on the surface thereof.

(2) Description of the Prior Art

When a thing is viewed through a transparent material, if reflected light is intense and a reflected image is clear, the observation is annoying. For example, in the case of an eyeglass lens, a reflected image called "ghost" or "flare" is formed and gives an unpleasant feeling to the eyes. Moreover, in case of a looking glass or the like, the object is blurred by reflected light on the glass surface.

As means for preventing reflection, there has heretofore been adopted a method in which a coating of a material having a refractive index different from that of the substrate is formed on the substrate by vacuum evaporation deposition or the like. It is known that in order to enhance the reflection-preventive effect in this method, selection of the film thickness of the material covering the substrate is very important. For example, it is known that in case of a monolayer coating film, if the optical thickness of the substance having a lower refractive index than that of the substrate is adjusted to $\theta$ of the wavelength of the objective ray or an odd number of times thereof, a minimum reflectance, that is, a maximum transmittance, is obtained. By the term "optical thickness" used herein is meant the product of the refractive index of the film-forming coating material and the thickness of the coating film.

Furthermore, formation of a multilayer antireflective coating is also known, and several proposals have been made in connection with selection of the thickness [see "Optics of Thin Films", pages 159–283, A. Vasicek (North-Holland Publishing Company), Amsterdam (1960)].

These antireflective coating films formed by vacuum evaporation deposition involve the following problems in some application fields.

(1) Since a high degree of vacuum is necessary, the size and material of the substrate are restricted. Moreover, the manufacturing time is prolonged, resulting in reduction of the productivity and increase of the manufacturing cost.

(2) Heating to a considerable extent is ordinarily necessary, and in some substrates, deformation or degradation is caused.

(3) The film-forming coating material used is in principle an inorganic oxide. Although an inorganic oxide gives a compact and dense film, if a plastic material is used as the substrate, reduction of the heat resistance and adhesion is caused owing to the difference in the coefficient of linear expansion between the coating film and the substrate.

(4) A dyestuff permeability, which is necessary for dyeing as effective means for coloring the transparent substrate, is completely lost.

(5) Also in a glass covered with a dyeable material, loss of the dyeability and reduction of the heat resistance and adhesion are similarly caused.

As means for rendering the surface of an optical element substantially non-reflecting without adopting the vacuum evaporation deposition technique, there can be mentioned a method in which a coating having fine particles is formed (see U.S. Pat. No. 2,536,764) and a method in which an optical element of polymeric material is provided with a microstructured surface (see U.S. Pat. No. 4,114,983). In these methods, reflected light is scattered to render the reflected image dim. However, the light transmitted through the transparent material is also scattered, and therefore, the effect of improving the transmittance while reducing the reflectance, as attained in the above-mentioned coating film obtained by vacuum evaporation deposition, cannot be attained. Furthermore, there is known a method in which a silicon coating is formed on a plastic substrate and then subjected to plasma polymerization to attain an antireflective effect (see U.S. Pat. No. 4,137,365). However, the dyestuff permeability is lost and since the coating film is formed from the gas phase, as in the vacuum evaporation deposition method, the productivity is low and the production cost is high.

We previously proposed an antireflective coating film having a dyestuff permeability, which is formed by treating an organic film containing inorganic fine particles with an activating gas (see U.S. Pat. No. 4,374,158). This coating film, however, is insufficient in heat resistance and water resistance at high temperatures.

Moreover, there is known an antireflective coating film for a solar cell, formed by the liquid two-layer coating method in which $TiO_2$—$SiO_2$—forming compounds are used for the first layer and $SiO_2$—forming compounds are used for the second layer (see Applied Optics, Vol. 18, No. 18, pages 3133–3138). This antireflective coating film, like the coating film formed by the vacuum evaporation deposition method, has no dyestuff permeability, and this antireflective coating film is readily cracked or broken by thermal or mechanical deformation.

SUMMARY OF THE INVENTION

It is a primary object of the present invention to provide an antireflective coating having a dyestuff permeability, which is excellent in durability, heat resistance and impact resistance.

Another object of the present invention is to provide a dyeable transparent material which has an antireflective coating excellent in durability, heat resistance and impact resistance.

More specifically, in accordance with the present invention, there is provided a transparent material having an antireflective coating comprising at least two layers, which is formed at least on a part of the surface of a substrate, wherein the thickness and refractive index of the layer (layer I) contiguous to the substrate and the thickness and refractive index of the outermost layer (layer O) satisfy the following requirements:

$$\frac{1}{4} \lambda \times 0.7 < n_I d_I < \frac{1}{4} \lambda \times 1.3,$$

and $$\frac{m}{4}\lambda \times 0.7 < n_O d_O < \frac{m}{4}\lambda \times 1.3,$$

wherein $n_I$ represents the refractive index of the layer contiguous to the substrate, $n_O$ represents the refractive index of the outermost layer, $d_I$ represents the film thickness (in nm) of the layer contiguous to the substrate, $d_O$ represents the film thickness (in nm) of the outermost layer, l is a positive integer, m is an odd positive integer and $\lambda$ stands for an optional standard wavelength (in nm) selected within the visible ray wavelength region or in the vicinity thereof, and $n_I > n_O$ and $n_I > n_S$ wherein $n_S$ represents the refractive index of the substrate,
the composition for forming the layer contiguous to the substrate is a composition comprising at least one member selected from the group consisting of alkoxides and acylates of titanium, aluminum and zirconium having 1 to 12 carbon atoms, preferably 1 to 8 carbon atoms, chelate compounds of said metals and dispersed phases in liquid of oxides of said metals, in an amount of at least 10% by weight as the metal oxide equivalent weight, based on the weight of the coating layer-forming coating components, and the composition for forming the outermost layer is a composition comprising at least one compound selected from the group consisting of an organic silicon compound represented by the following general formula:

$$R_a^1 R_b^2 Si(OR)_{4-a-b}$$

wherein $R^1$ and $R^2$ independently stand for a hydrocarbon group having 1 to 10 carbon atoms, which contains an alkyl, alkenyl, aryl, halogeno, epoxy, amino, mercapto, methacryloxy or cyano group, R stands for an alkyl, alkoxyalkyl or acyl group having 1 to 8 carbon atoms, a and b are 0 or 1, and the sum of a and b is 1 or 2,
and a hydrolyzed product of said organic silicon compound in an amount of at least 20% by weight as the solid content equivalent weight and based on the weight of the coating layer-forming coating components.

DETAILED DESCRIPTION OF THE PREFERRED EMBODIMENTS

Figure 1:
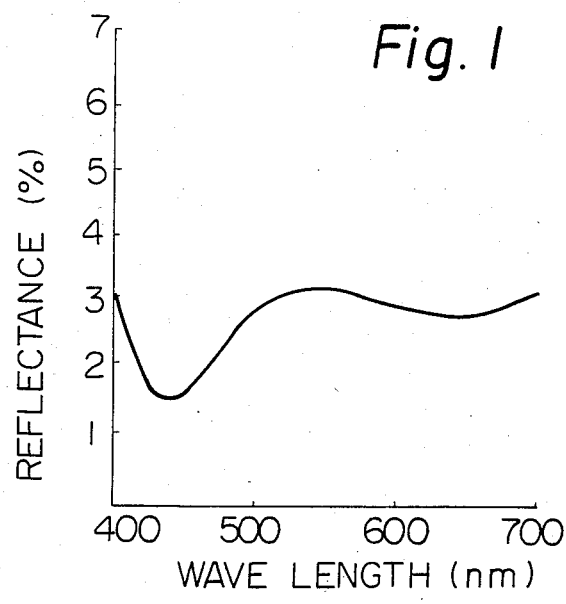
FIG. 1 is a graph showing the reflective photospectrum of an antireflective lens exhibiting a yellowish green reflected light color according to one embodiment of the present invention.

The transparent substrate used in the present invention is a substrate having such a transparency that the haze value represented by the following formula is not more than 80%:

$$\text{Haze value (percent)} = \frac{\text{diffused light transmittance}}{\text{luminous transmittance}} \times 100$$

This transparent substrate may be colored or color-patterned according to need or may be, covered with a coating giving a scratch resistance, so long as the haze value determined according to the above formula is not more than 80%.

In order to attain the intended effects of the present invention, that is, the effects of reducing the luminous reflectance and enhancing the luminous transmittance, it is preferred that the transparency of the substrate be as high as possible. A substrate in which reduction of the luminous reflectance is sufficient only on one surface and the opposite surface is covered with an opaque material may also be used as the transparent substrate in the present invention. In this case, the haze value should be defined as that of the substrate from which the opaque material on the opposite surface is removed.

Molded articles, sheets and films of glass and plastic materials can be mentioned as the transparent substrate. When a plastic article is used as the substrate, a coating material may be applied to the substrate for improving or imparting such properties as adhesion, hardness, chemical resistance, durability and dyeability. However, the substrate covered with this coating material should have the above-mentioned transparency, that is, a haze value of not more than 80%.

In the present invention, liquid compositions are applied to the transparent substrate to form a multilayer antireflective coating thereon. In these liquid compositions, it is not indispensable that all the components be liquid. For example, some components are dispersed as particulate solid substances to give a heterogeneous composition, so long as the composition as a whole can be treated as a liquid in the coating operation. From the viewpoint of the antireflective effect and surface-protecting effect, it is indispensable that the liquid compositions comprise components described below.

The composition for forming the layer contiguous to the substrate should be a composition comprising at least one member selected from alkoxides and acylates of titanium, aluminum and zirconium having 1 to 12 carbon atoms, preferably 1 to 8 carbon atoms, chelate compounds of said metals and dispersions in liquid of oxides of said metals in an amount, as the metal oxide equivalent weight, of at least 10% by weight based on the weight of a coating-forming component. As examples of the metal compound, there can be mentioned metal alkoxides such as titanium tetraethoxide, titanium tetra-i-propoxide, titanium tetra-n-propoxide, titanium tetra-n-butoxide, titanium tetra-sec-butoxide, titanium tetra-tert-butoxide, tetrakis(2-ethylhexoxy)titanium, aluminum triethoxide, aluminum tri-i-propoxide, aluminum tributoxide, zirconium tetraethoxide, zirconium tetra-i-propoxide, zirconium tetra-n-propoxide, zirconium tetra-n-butoxide, zirconium tetra-sec-butoxide and zirconium tetra-tert-butoxide; metal acylates such as titanium dibutoxide diacetate and titanium dibutoxide dipropionate; chelate compounds such as di-isopropoxytitanium bisacetylacetonate, dibutoxytitanium bisacetylacetonate, diethoxytitanium bis-acetylacetonate, zirconium tetrakisacetylacetonate, zirconium monobutoxytrisacetylacetonate, zirconium dibutoxybisacetylacetonate, zirconium tributoxyacetylacetonate, aluminum acetylacetonate, aluminum di-n-butoxide monoethylacetoacetate, aluminum di-i-propoxide monomethylacetoacetate, tri-n-butoxide zirconium monoethylacetoacetate, n-butoxide zirconium trisethylacetonate and di-n-butoxide bisethylacetonate; and oligomers and polymers obtained by condensation of hydrolysate of the above-mentioned alkoxides. Furthermore, dispersions in liquid, especially in water or alcohol, of fine particles of oxides of titanium, aluminum and zirconium may be used.

Based on the supposition that the above-mentioned metal compound is converted to $(TiO_2)_x$, $(Al_2O_3)_y$ or $(ZrO_2)_z$ (which x, y and z are positive integers) in the formed coating, the amount of this metal compound is expressed as the metal oxide equivalent weight. It is indispensable that the above-mentioned metal compound be contained in an amount, as the metal oxide equivalent weight, of at least 10% by weight based on the weight of the coating layer-forming components. If the amount of the metal compound is smaller than 10% by weight, the antireflective effect is undesirably low.

The composition for forming the outermost layer should be a composition comprising at least one compound selected from organic silicon compounds represented by the following general formula:

$$R_a^1 R_b^2 Si(OR)_{4-a-b}$$

and hydrolyzed products of said organic silicon compounds in an amount, as the solid content equivalent weight, of at least 20% weight based on the weight of layer-forming coating components.

In the above general formula, $R^1$ and $R^2$ stand for a hydrocarbon group having 1 to 10 carbon atoms, which contains an alkyl, alkenyl, aryl, halogeno, epoxy, amino, mercapto, methacryloxy or cyano group, R stands for an alkyl, alkoxy-alkyl or acyl group having 1 to 8 carbon atoms, a and b are 0 or 1, and the sum of a and b is 1 or 2.

As examples of the above-mentioned organic silicon compound, there can be mentioned trialkoxy-, triacyloxy- and triphenoxy-silanes such as methyltrimethoxysilane, methyltriethoxysilane, methyltrimethoxyethoxysilane, methyltriacetoxysilane, methyltributoxysilane, ethyltrimethoxysilane, ethyltriethoxysilane, vinyltrimethoxysilane, vinyltriethoxysilane, vinyltriacetoxysilane, vinyltrimethoxyethoxysilane, phenyltrimethoxysilane, phenyltriethoxysilane, phenyltriacetoxysilane, γ-chloropropyltrimethoxysilane, γ-chloropropyltriethoxysilane, γ-chloropropyltriacetoxysilane, 3,3,3-trifluoropropyltrimethoxysilane, γ-methacryloxypropyltrimethoxysilane, γ-aminopropyltrimethoxysilane, γ-aminopropyltriethoxysilane, γ-mercaptopropyltrimethoxysilane, γ-mercaptopropyltriethoxysilane, N-β(aminoethyl)-γ-aminopropyltrimethoxysilane, β-cyanoethyltriethoxysilane, methyltriphenoxysilane, chloromethyltrimethoxysilane, chloromethyltriethoxysilane, glycidoxymethyltrimethoxysilane, glycidoxymethyltriethoxysilane, α-glycidoxyethyltrimethoxysilane, α-glycidoxyethyltriethoxysilane, β-glycidoxyethyltrimethoxysilane, β-glycidoxyethyltriethoxysilane, α-glycidoxypropyltrimethoxysilane, α-glycidoxypropyltriethoxysilane, β-glycidoxypropyltrimethoxysilane, β-glycidoxypropyltriethoxysilane, γ-glycidoxypropyltrimethoxysilane, γ-glycidoxypropyltriethoxysilane, γ-glycidoxypropyltripropoxysilane, γ-glycidoxypropyltributoxysilane, γ-glycidoxypropyltrimethoxyethoxysilane, γ-glycidoxypropyltriphenoxysilane, α-glycidoxybutyltriethoxysilane, α-glycidoxybutyltriethoxysilane, β-glycidoxybutyltrimethoxysilane, β-glycidoxybutyltriethoxysilane, γ-glycidoxybutyltrimethoxysilane, γ-glycidoxybutyltriethoxysilane, δ-glycidoxybutyltrimethoxysilane, δ-glycidoxybutyltriethoxysilane, (3,4-epoxycyclohexyl)methyltrimethoxysilane, (3,4-epoxycyclohexyl)methyltriethoxysilane, β-(3,4-epoxycyclohexyl)ethyltrimethoxysilane, β-(3,4-epoxycyclohexyl)ethyltriethoxysilane, β-(3,4-epoxycyclohexyl)ethyltripropoxysilane, β-(3,4-epoxycyclohexyl)ethyltributoxysilane, β-(3,4-epoxycyclohexyl)ethyltrimethoxyethoxysilane, β-(3,4-epoxycyclohexyl)ethyltriphenoxysilane, γ-(3,4-epoxycyclohexyl)propyltrimethoxysilane, γ-(3,4-epoxycyclohexyl)propyltriethoxysilane, δ-(3,4-epoxycyclohexyl)butyltrimethoxysilane and δ-(3,4-epoxycyclohexyl)butyltriethoxysilane; and dialkoxysilanes and diacyloxysilanes such as dimethyldimethoxysilane, phenylmethyldimethoxysilane, dimethyldiethoxysilane, phenylmethyldiethoxysilane, γ-chloropropylmethyldimethoxysilane, γ-chloropropylmethyldiethoxysilane, dimethyldiacetoxysilane, γ-methacryloxypropylmethyldimethoxysilane, γ-methacryloxypropylmethyldiethoxysilane, γ-mercaptopropylmethyldimethoxysilane, γ-mercaptopropylmethyldiethoxysilane, γ-aminopropylmethyldimethoxysilane, γ-aminopropylmethyldiethoxysilane, methylvinyldimethoxysilane, methylvinyldiethoxysilane, glycidoxymethylmethyldimethoxysilane, glycidoxymethylmethyldiethoxysilane, α-glycidoxyethylmethyldimethoxysilane, α-glycidoxyethylmethyldiethoxysilane, β-glycidoxyethylmethyldimethoxysilane, β-glycidoxyethylmethyldiethoxysilane, β-glycidoxypropylmethyldimethoxysilane, α-glycidoxypropylmethyldiethoxysilane, β-glycidoxypropylmethyldimethoxysilane, β-glycidoxypropylmethyldiethoxysilane, γ-glycidoxypropylmethyldimethoxysilane, γ-glycidoxypropylmethyldiethoxysilane, γ-glycidoxypropylmethyldipropoxysilane, γ-glycidoxypropylmethyldibutoxysilane, γ-glycidoxypropylmethyldimethoxyethoxysilane, γ-glycidoxypropylmethyldiphenoxysilane, γ-glycidoxypropylethyldimethoxysilane, γ-glycidoxypropylethyldiethoxysilane, γ-glycidoxypropylvinyldimethoxysilane, γ-glycidoxypropylvinyldiethoxysilane, γ-glycidoxypropylphenyldimethoxysilane and γ-glycidoxypropylphenyldiethoxysilane.

These organic silicon compounds may be used either alone or in the form of a mixture of two or more of them. In order to impart the dyeability, use of epoxy group-containing organic silicon compounds is especially preferred.

In order to lower the curing temperature and promote the hardening, it is preferred that these organic silicon compounds be used after they are hydrolyzed.

The hydrolysis can be accomplished by adding pure water or an aqueous acid solution such as hydrochloric acid, acetic acid or sulfuric acid to the organic silicon compound and stirring the mixture. The degree of hydrolysis can easily be controlled by adjusting the amount of pure water or the aqueous acid solution used. In view of promotion of the hydrolysis, it is especially preferred that 1 to 3 moles, per mole of the alkoxy group, of pure water or the aqueous acid solution be added for the hydrolysis.

Since an alcohol or the like is produced upon hydrolysis, the hydrolysis can be carried out in the absence of a solvent. However, in order to perform the hydrolysis uniformly, there may be adopted a method in which the organic silicon compound is mixed with a solvent and the hydrolysis is then carried out. Furthermore, for a certain purpose, the hydrolyzed product may be used after an appropriate amount of the alcohol or the like produced by the hydrolysis is removed by heating and/or under reduced pressure. Moreover, in order to promote the hydrolysis reaction and advance the pre-condensation, the reaction mixture may be heated at a temperature higher than room temperature. Needless to say, in order to control the pre-condensation, the hydrolysis reaction may be carried out at a temperature of not higher than room temperature.

It is indispensable that the organic silicon compound or the hydrolyzed product thereof be contained in an amount, as the solid content equivalent weight, of at least 20% by weight based on the weight of the coating layer-forming components.

The solid content equivalent weight referred to herein means the amount equivalent to the formula weight, corresponding to $R_a{}^1R_b{}^2SiO_{4-a-b}$, of the organic silicon compound represented by the general formula $R_a{}^1R_b{}^2Si(OR)_{4-a-b}$. For example, in case of methyltrimethoxysilane [$CH_3Si(OCH_3)_3$: molecular weight=136], the solid content equivalent weight of 1 g of this compound is the amount corresponding to $CH_3SiO_{3/2}$ (formula weight=67), that is, 0.493 g (=67/136).

If the solid content equivalent weight of the organic silicon compound or the hydrolyzed product thereof is smaller than 20% by weight, such properties as surface hardness, flexibility and durability are degraded.

In order to obtain a coating which can be practically acceptable in such properties as refractive index, hardness, durability, dyeability, water resistance, smoothness and adaptability to the coating operation, various components may be added to the respective coating compositions for forming an antireflective coating in addition to the above-mentioned indispensable components. As the coating layer-forming component, there may preferably be used various organic resins and aqueous or organic solvent dispersions of various inorganic fine particles, especially, silica called "colloidal silica", which has an average particle diameter of 5 to 100 nm (surface-treated silica and coated silica are included).

As the organic resin to be suitably employed for formation of a coating layer having a relatively high refractive index, there are preferably used resin compositions having a relatively high refractive index, such as compositions comprising polystyrene, a polystyrene copolymer, a polycarbonate, a polymer having an aromatic ring group other than polystyrene, a polymer having a heterocyclic or alicyclic group or a polymer containing a halogen other than fluorine, thermosetting resin-forming compositions comprising a melamine resin, a phenolic resin or an epoxy resin as a curing agent, urethane-forming compositions comprising an alicyclic or aromatic isocyanate and/or a polyol, and compositions comprising a modified resin or prepolymer rendered radical-curable by introducing a double bond into a compound as described above.

As the organic resin to be suitably employed for formation of a coating layer having a relatively low refractive index, for example, an outermost layer, there are preferably used resin compositions having a relatively low refractive index, such as compositions comprising an aromatic ring-free vinyl copolymer inclusive of an acrylic copolymer, a fluorine-substituted polymer, an aromatic ring-free polyester, a cellulose derivative, a silicone polymer or a hydrocarbon polymer, compositions comprising a prepolymer of a polymer as mentioned above, compositions comprising a curable functional group-containing polymer selected among the foregoing polymers and a curing agent, and compositions comprising a modified resin or prepolymer rendered radical-curable by introducing a double bond into a compound as described above.

Moreover, tetraalkoxysilanes such as methyl silicate, ethyl silicate, n-propyl silicate, i-propyl silicate, n-butyl silicate, sec-butyl silicate and t-butyl silicate, and hydrolyzed products thereof may preferably be used. If a tetraalkoxysilane or a hydrolyzed product thereof is incorporated into the outermost layer, an antistatic effect can be given to the antireflective coating.

Various additives, for example, a leveling agent and a defoamer for improving the adaptability to the coating operation, an ultraviolet absorber and an antioxidant as the coating modifier, and a surfactant for giving an antifogging property and an antistatic property may be added to the liquid coating compositions.

In the coating operation, the compositions are ordinarily coated in the state diluted with a volatile solvent. The kind of the solvent is not particularly critical, but an appropriate solvent should be selected while the stability of the compositions, the wetting property to the transparent substrate and the volatility are taken into consideration. The solvent may be used either alone or as a mixture of two or more solvents.

Certain solvents are effective for stabilizing the liquid coating compositions. For example, an alcohol having up to 8 carbon atoms, a monoalkyl ether or ethylene glycol or diethylene glycol, a diketone such as acetylacetone, an organic acid such as acetic acid and a keto ester such as ethyl acetoacetate are especially effective for stabilizing alkoxides and chelate compounds of titanium, zirconium and aluminum.

By the term "liquid coating composition" used herein is meant a composition having a viscosity ordinarily applicable to the coating operation, and. The liquid coating composition has a viscosity of not more than 10 poises, preferably not more than 1 poise, at the application temperature. In case of a liquid composition having too high a viscosity, it is difficult to obtain a uniform coating. Customary coating methods may be adopted, but in order to control the film thickness of the coating layer, curtain flow coating, dip coating, roller coating and spin coating methods are preferably adopted.

In order to attain the objects of the present invention, any transparent materials may be used as the transparent substrate, but in view of the fact that liquid compositions are coated, glass and plastic materials are especially preferred. As the plastic material, there are preferably used polymethyl methacrylate, a copolymer thereof, a polycarbonate, a diethylene glycol bisallyl carbonate polymer (CR-39), a polyester, particularly polyethylene terephthalate, an unsaturated polyester, an acrylonitrilestyrene copolymer, a vinyl chloride polymer resin, a polyurethane and an epoxy resin. Glass substrates may also advantageously be used. Moreover, a substrate of a plastic material as mentioned above or a glass substrate, which is covered with a coating material, can also preferably be used.

Such properties as adhesion, hardness, chemical resistance, durability and dyeability can be improved by the coating material of the undercoat layer beneath the antireflective coating of the present invention. Various materials known to provide surface-hardened coating films of plastics may be used for improving the hardness (see, for example, U.S. Pat. Nos. 3,894,881 and 4,211,823). A dyeable, highly hardened coating film disclosed in U.S. Pat. No. 4,211,823 is especially preferably applied to the antireflective multilayer coating of the present invention because the object of obtaining an antireflective coating having a dyestuff permeability, can effectively attained.

Various combinations of the substrate or coated substrate and the antireflective multilayer coating may be considered for attaining the objects of the present invention, and optimum combinations can be experimentally determined according to intended applications.

The above-mentioned liquid coating compositions are coated on a transparent substrate as described above. The coated compositions for the respective layers may be heat-cured and/or dried stepwise. Furthermore, there may be adopted a method in which a coating film of the first layer is pre-cured and/or dried and a second layer is then coated and cured. In case of a three-layer antireflective coating, there may be adopted a method in which first and second layers are independently pre-cured and/or dried and a third layer is then coated and heat-cured and/or dried. Heating may be accomplished by hot air or infrared rays. The heating temperature should be decided according to the transparent substrate to be coated and the coating composition to be used, but the heating temperature is ordinarily 50° to 250° C. and preferably 60° to 200° C. If the heating temperature is too low, curing or drying is insufficient, and if the heating temperature is too high, thermal degradation is caused, resulting in undesirable yellowing.

Furthermore, curing may be effected with radiation such as ultraviolet rays, electron beams or gamma rays by utilizing curable functional groups, for example, double bonds in a polymer or prepolymer.

In the cured multilayer antireflective coating, it is indispensable that the refractive index ($n_I$) of the layer contiguous to the substrate and the refractive index ($n_O$) of the outermost layer satisfy the requirements of $n_I > n_O$ and $n_I > n_S$, in which $n_S$ represents the refractive index of the substrate (the coating material in case of the coated substrate). It is preferred that $n_I$ be higher by at least 0.03, more preferably by at least 0.05, than $n_O$ and $n_S$.

In the case of a three-layer antireflective coating, it is preferred that the requirements of $n_I > n_O$, $n_I > n_S$, and $n_S < n_I < n_M$ be satisfied in which $n_S$ and $n_I$, $n_O$ are as defined above and $n_M$ represents the refractive index of the intermediate layer. It also is preferred that the film thickness $d_M$ of the intermediate layer satisfies the following requirement:

$$\frac{n}{4} \lambda \times 0.7 < n_M d_M < \frac{n}{4} \lambda \times 1.3$$

Furthermore, it is preferred that $n_M$ be higher by at least 0.03, more preferably by at least 0.05, than $n_I$.

In coating the compositions for the respective layers of the multilayer antireflective coating, the adhesion can be improved if the layers contiguous to each other are subjected to a chemical or physical treatment.

In the present invention, it is indispensable that the thickness of each layer of the antireflective coating within the range satisfying the above-mentioned requirement.

If the above-mentioned relation between the thickness and the refractive index is not established in the respective layers of the antireflective coating, no substantial antireflective effect can be attained. When the two-layer antireflective coating is compared with the three-layer antireflective coating, it is seen that the former coating is advantageous in that the frequency of the coating operation is reduced and a product having a good uniformity and a good dyestuff permeability can easily be obtained, while the former coating is inferior in that the reflectance is readily influenced by the thickness unevenness and when the reflectance is set at a predetermined value, the range for selection of the color of reflected light is restricted.

The transparent material having the above-mentioned antireflective coating is effectively used for a vehicle window or building window, an optical lens such as an eyeglass lens or camera lens or a cover for various display devices, especially a CRT filter (cathode ray tube filter). In the case of a CRT filter, if a circular polarization plate is used as the substrate, rays transmitted through the filter drastically attenuate rays reflected on the surface of the CRT and simultaneously attenuate rays reflected from the filter. Thus, a characteristic antireflective filter can be provided.

Since the antireflective coating of the present invention has a dyestuff permeability, the dyeable substrate or coated substrate can be dyed in the present invention. For example, in case of a plastic eyeglass lens, for protection of the eyes and improvement of the fashion property, there is often adopted a method in which the lens is partially or entirely colored by dyeing. However, since antireflective coatings formed by the conventional antireflective processing method utilizing the vacuum evaporation deposition technique have no dyestuff permeability, for attaining the antireflective effect and coloring lenses, there has heretofore been adopted a method in which a lens substrate is dyed in advance or an originally colored lens substrate is used and the lens substrate is subjected to an antireflective treatment. Antireflective colored lenses formed according to this method, however, involve the following problems.

(1) Since a high degree of vacuum is necessary for forming an antireflective coating by the vacuum evaporation deposition method, the density and hue of the colored lens to be treated are changed by the antireflective coating-forming operation, and therefore, the reproducibility is poor.

(2) Since formation of the antireflective coating is carried out after coloration of the lens, requirements for a variety of colorations cannot easily be satisfied.

(3) In the case where an error is made at the antireflective treatment step, correction is difficult, and the manufacturing cost is significantly influenced.

In the case where the antireflective coating of the present invention is employed, since the antireflective coating is first formed and the dyeing operation is then carried out, the foregoing disadvantages can be eliminated.

The dyeing referred to in the present invention includes not only entirely uniform dyeing or graduated dyeing of the lens or antireflective coating with an organic dyestuff such as a disperse dye, a basic dye, an acid dye or a metal complex dye but also pattern dyeing using a transfer sheet. The properties of the dyestuff should be controlled appropriately according to the intended use by using water, a paste, a dyeing assistant, a leveling agent, a pH control agent and the like. In order to increase the dyeing speed and density, an organic chemical "carrier" may be added to the dyestuff to enhance the dyeing characteristics. A viscous pasty dye solution thus prepared is applied to the antireflective coating according to the screen printing method or the like, or pattern dyeing can be accomplished according to a method in which a pattern is printed on a flexible substrate such as paper, cloth or film with the dye paste, the printed substrate is applied to the antireflective coating to produce a close adhesion state between the surfaces of the dye layer and the antireflective coating and the assembly is subjected to a dry or wet heat treatment at 60° to 200° C. for 10 minutes to 2 hours to effect transfer of the dye to the coating and fixation of the dye. After the dyeing operation, the excessive dye paste or dye-supporting layer is removed by washing with warm water or cold water.

As the dyestuff, there may be used not only coloring dyes having an absorption in the visible wavelength region but also photochromic dyes to be colored by ultraviolet rays and fluorescent dyes emitting fluorescence.

The transparent material having the antireflective coating according to the present invention has the following effects in addition to the antireflective effect.

(1) The transparent material can be dyed with a disperse dye or the like.

(2) The heat resistance and hot water resistance are excellent.

(3) The surface hardness is high and the transparent material has a high scratch resistance. (4) The chemical resistance is excellent. The present invention will now be described in detail with reference to the following Examples that by no means limit the scope of the invention.

EXAMPLE 1

(1) Preparation of Coating Composition for First Layer:

A beaker equipped with a rotor was charged with 368 g of n-propyl alcohol, 42.7 g of phenetyl alcohol and 0.64 g of a silicone type surfactant. 17.8 g of colloidal silica dispersed in methanol (average particle diameter=12±1 nm, solid content=30%) was added to the liquid mixture at room temperature with stirring and 23 g of tetra-n-butyl titanate was further added to form a coating composition.

(2) Preparation of Coating Composition for Second Layer:

(a) Preparation of Silane Hydrolyzate:

A mixture of 14.1 g of γ-glycidoxypropyltrimethoxysilane, 14.3 g of γ-glycidoxypropylmethyldiethoxysilane and 30.7 g of γ-chloropropyltrimethoxysilane was cooled to 10° C., and then 13.6 g of a 0.05N aqueous solution of hydrochloric acid was dropped to the mixture with stirring. The mixture was further stirred at room temperature for 1 hour to obtain a silane hydrolyzate.

(b) Preparation of Coating Composition:

19.3 g of the above-mentioned silane hydrolyzate, 264.0 g of methanol, 29.0 g of water and 0.3 g of a silicone type surfactant were sufficiently mixed, and 35.3 g of the same colloidal silica dispersed in methanol as used in (1) above and 1.1 g of aluminum acetylacetonate were added to the mixture. The resulting mixture was sufficiently stirred to form a coating composition.

(3) Coating and Curing:

A diethylene glycol bisallyl carbonate polymer lens (Plano lens CR-39, 75 mm in diameter and 2.1 mm in thickness), which had been dipped in an aqueous sodium hydroxide solution and washed, was coated with the coating composition prepared in (1) above according to the dip coating method at a pull-up speed of 10 cm/min. The coated lens was heat-cured for 20 minutes in an air drying oven at 90° C., and immediately, the coated lens was treated under constant-temperature and constant-humidity conditions of a temperature of 80° C. and a relative humidity of 90% for 1 hour and was then heated and dried in an air drying oven at 110° C. The refractive index of the obtained first layer was 1.62 and the film thickness was 82 nm. The refractive index of the substrate (transparent substrate) contiguous to the first layer was 1.49. The obtained first layer was treated for 1 minute in a surface-treating plasma device (PR 501A supplied by Yamato Kagaku K.K.) at an oxygen flow rate of 100 ml/min and an output of 50 W.

The coating composition prepared in (2) above was coated for the surface-treated first layer in the same manner as described above with respect to the coating composition for the first layer. The coated lens was heated and cured at 110° C. for 1 hour. The refractive index of the obtained second layer was 1.43 and the film thickness was 106 nm.

The luminous transmittance of the obtained lens was 96.0% and the lens had an antireflective effect. Incidentally, the luminous transmittance of the uncoated lens was 92.4%.

EXAMPLE 2

(1) Preparation of Undercoating Composition:

(a) Preparation of Silane Hydrolyzate:

106.8 g of γ-glycidoxypropylmethyldiethoxysilane was cooled to 10° C., and 15.5 g of an aqueous 0.05N hydrochloric acid solution was gradually dropped with stirring. After completion of the dropwise addition, the mixture was stirred at room temperature for 1 hour to obtain a silane hydrolyzate.

(b) Preparation of Coating Composition:

To the above-mentioned silane hydrolyzate were added 25 g of an epoxy resin ("Epikote 827" supplied by Shell Kagaku Kabushiki kaisha), 25 g of an epoxy resin ("Epolite 3002" supplied by Kyoeisha Yushi Kagaku Kogyo K.K.), 58.9 g of diacetone alcohol, 29.5 g of benzyl alcohol, 310 g of methanol and 1.5 g of a silicone type surfactant, and 416.7 g of the same colloidal silica dispersed in methanol as used in Example 1 and 12.5 g of aluminum acetylacetonate were further added. The mixture was sufficiently stirred to obtain a coating composition.

(2) Coating, Curing and Pre-treatment of Undercoat:

The same diethylene glycol bisallyl carbonate polymer lens as used in Example 1 was coated with the above-mentioned coating composition according to the dip coating method, and the coated lens was heated at 93° C. for 4 hours. The cured lens was subjected to the same activating gas treatment as described in Example 1 as the pre-treatment. The treatment time was 30 seconds.

(3) Production of Antireflective Coating:

An antireflective coating was formed by using the above undercoated lens in the same manner as described in Example 1 except that the coating composition for the second layer was diluted with 90 g of methanol and 10 g of water. The film thickness of the second layer was 95 nm. The refractive index of the substrate layer (undercoat layer) contiguous to the first layer was 1.50.

(4) Test Results:

The luminous transmittance of the obtained lens was 96.9%, and the reflected light had a reddish violet color. When the abrasion resistance of the obtained lens was examined by using steel wool #0000, any scratches were hardly formed by the abrasion. The antireflective lens was dyed at 90° C. for 30 minutes by using a dyeing solution formed by dispersing and dissolving a mixture of red, blue and yellow disperse dyes into water. The lens was dyed to such an extent that the luminous transmittance was reduced to 60%. Even by the dyeing treatment, the antireflective effect was not reduced at all.

EXAMPLE 3

(1) Preparation of Coating Composition for First Layer:
 (a) Preparation of Silane Hydrolyzate:
 To 23.6 g of γ-glycidoxypropyltrimethoxysilane was dropped 5.4 g of an aqueous 0.01N hydrochloric acid solution at 10° C., and after completion of the dropwise addition, the mixture was stirred at room temperature for 1 hour to obtain a silane hydrolyzate.
 (b) Preparation of Coating Composition:
 5.24 g of the above-mentioned silane hydrolyzate, 19.4 g of tetra-n-butyl titanate, 275.2 g of n-propyl alcohol and 0.15 g of aluminum acetylacetonate were mixed together to form a coating composition.
(2) Preparation of Coating Composition for Second Layer:
 17.4 g of the silane hydrolyzate prepared in (1)–(a) above and 0.13 g of a silicone type surfactant were added to 232 g of n-propyl alcohol, and then 0.5 g of aluminum acetylacetonate was added. The mixture was sufficiently stirred to form a coating composition.
(3) Coating, Curing and Pre-treatment:
 A lens undercoated in the same manner as in Example 2 was coated with the coating composition for the first layer and the coating composition for the second layer, prepared in (1) and (2) above, in the same manner as described in Example 1. The refractive index of the first layer was 1.73 and the film thickness was 70 nm, and the refractive index of the second layer was 1.48 and the film thickness was 117 nm. Incidentally, the refractive index of the substrate layer (undercoating layer) contiguous to the first layer was 1.50.
(4) Test Results:
 The luminous transmittance of the obtained lens was 97.0%. When the lens was subjected to the abrasion test in the same manner as described in Example 2, formation of scratches was not observed at all.

EXAMPLE 4

(1) Preparation of Coating Composition for First Layer:
 26.0 g of tetra-n-butyl titanate and 20.0 g of the same colloidal silica dispersed in methanol as used in Example 1 were added to 358.5 of acetylacetone with stirring to form a coating composition.
(2) Preparation of Coating Composition for Second Layer:
 To 6.94 g of the silane hydrolyzate prepared in (1)–(a) of Example 3 were added 260 g of n-propanol, 111 g of water and 32.0 g of ethyl cellosolve, and the mixture was sufficiently stirred. Then, 13.3 g of the same colloidal silica dispersed in methanol as used in Example 1 and 0.4 g of aluminum acetylacetonate were added to the mixture, and the resulting mixture was sufficiently stirred to obtain a coating composition.
(3) Coating and Curing:
 A polymethyl methacrylate cast sheet ("Sumipex" supplied by Sumitomo Kagaku Kogyo K.K., 2 mm in thickness) was washed with water and a detergent, and it was coated with the coating composition for the first layer according to the dip coating method at a pull-up speed of 10 cm/min. The coated sheet was dried for 60 minutes in an air drying oven at 93° C. and dipped in hot water maintained at 50° C. for 60 minutes, and after water drops were removed by nitrogen gas blowing, the sheet was heated and dried at 93° C. for 60 minutes. The coating composition for the second layer was coated on the first layer according to the same dip coating method as described above with respect to the coating composition for the first layer, and the coated sheet was heated and cured for 2 hours in an air drying oven at 93° C.
(4) Test Results:
 The luminous transmittance of the obtained polymethyl methacrylate cast sheet was 95.0%. Incidentally, the luminous transmittance of the uncoated polymethyl methacrylate cast sheet was 92.2%. The refractive index of the first layer was 1.76 and the film thickness was 43 nm. The refractive index of the second layer was 1.43 and the film thickness was 92 nm.
 Incidentally, the refractive index of the substrate layer (polymethyl methacrylate cast sheet) contiguous to the first layer was 1.49.

EXAMPLE 5

The procedures of Example 4 were repeated in the same manner except that an inorganic glass lens (65 mm in diameter and 2.0 mm in thickness) was used as the transparent substrate.

The luminous transmittance of the obtained lens was 96.0%. Incidentally, the luminous transmittance of the uncoated glass lens was 91.9%. The refractive indexes and film thicknesses of the first and second layers were the same as those in Example 4. The refractive index of the substrate layer (inorganic glass lens) contiguous to the first layer was 1.51.

EXAMPLE 6

The procedures of Example 4 were repeated in the same manner except that an undercoated polymethyl methacrylate cast sheet described below was used.
(1) Preparation of Undercoating Composition:
 (a) Preparation of Vinyltriethoxysilane Hydrolyzate:
 To 26.0 g of vinyltriethoxysilane was added 2.0 g of acetic acid, and 7.4 g of an aqueous 0.05N hydrochloric acid solution was dropped to the mixture with stirring while controlling the temperature to 20° C. to obtain a hydrolyzate.
 (b) Preparation of Methyltrimethoxysilane Hydrolyzate:
 To 37.2 g of methyltrimethoxysilane was added 2.8 g of acetic acid, and 14.7 g of an aqueous 0.01N hydrochloric acid solution was dropped to the mixture with stirring while controlling the temperature to 20° C. to obtain a hydrolyzate.
 (c) Preparation of Coating Composition:
 The hydrolyzates prepared in (a) and (b) above were mixed together, and 8 g of xylene, 2 g of n-butyl acetate, 0.15 g of a silicone type surfactant and 0.2 g of sodium acetate were homogeneously dissolved in the above mixture to form a coating composition.
(2) Coating and Curing of Undercoating and Pre-treatment:
 The undercoating composition prepared in (1) above was coated on the same polymethyl methacrylate cast sheet as used in Example 4 according to the dip coating method at a pull-up speed of 20 cm/min, and the coated sheet was heated and cured for 2 hours in an air drying oven at 90° C. The obtained cast sheet was dipped in an aqueous 10% sodium hydroxide solution for 5 minutes at 30° C. to form a transparent sheet.
(3) Test Results:
 The luminous transmittance of the obtained polymethyl methacrylate cast sheet was 98.0%, and the antireflective effect was so high that no substantial reflection was observed. When the abrasion test was carried out in the same manner as described in Example 2, formation of scratches was not observed at all. When the treated sheet was irradiated with ultraviolet rays for 20 hours in a Fade-meter, no change of the transmittance was observed, and it was confirmed that the treated sheet had a very good light resistance. The refractive index of the substrate layer (undercoat layer) contiguous to the first layer was 1.46. The refractive indexes and film thicknesses of the first and second layers were the same as those in Example 4.

EXAMPLE 7

(1) Preparation of Coating Composition for First Layer:

To 387 g of acetyl acetone were added 13.8 g of tetra-n-butyl titanate, 8.9 g of tetra-n-butyl zirconate and 21.3 g of the same colloidal silica dispersed in methanol as used in Example 1 with stirring, and the mixture was sufficiently stirred to obtain a coating composition.

(2) Coating, Curing and Test Results:

Coating and curing were carried out in the same manner as described in Example 6 except that the above-mentioned composition was used as the coating composition for the first layer.

The luminous transmittance of the obtained cast sheet was 98.1%, and the reflected light had a reddish violet color. At the abrasion test and the light resistance test using a Fade-meter, good results were obtained. The refractive index of the first layer was 1.56 and the film thickness was 101 nm, and the refractive index and film thickness of the second layer were the same as those of the second layer in Example 4. The refractive index of the substrate layer contiguous to the first layer was the same as the refractive index of the substrate layer of Example 6.

EXAMPLE 8

(1) Preparation of Coating Composition for First Layer:

73.3 g of tetra-n-butyl titanate and 85 g of the same colloidal silica dispersed in methanol as used in Example 1 were added to 796 g of acetylacetone with stirring, and 0.5 g of a silicone type surfactant was further added to obtain a coating composition.

(2) Coating, Curing and Test Results:

A lens undercoated according to the method described in Example 2 was spin-coated with the coating composition for the first layer prepared in (1) above under conditions described below. The coated lens was heated at 93° C. for 45 minutes, dipped in hot water maintained at 50° C. for 1 hour and then heated at 93° C. for 45 minutes.

Spin Coating Conditions:
Rotation number=3500 rpm
Rotation time=25 seconds

A coating composition for the second layer, prepared in (3)–(b) below, was spin-coated on the first layer under the same conditions as adopted for formation of the first layer, and the coated lens was heated and cured for 2 hours in an air drying oven at 93° C.

The luminous transmittance of the obtained lens was 96.7%, and the reflected light had a reddish violet color. When the lens was subjected to the abrasion test and the light resistance test using a Fade-meter, good results were obtained. When the dyeing test was carried out in the same manner as described in Example 2, the lens was dyed to such an extent that the luminous transmittance was reduced to 55%, and the antireflective effect was retained even after the dyeing treatment. When the impact resistance of this antireflective lens was examined by the falling ball test according to the FDA Standard, no fracture was observed before or after the dyeing treatment, and it was confirmed that the lens had an excellent impact resistance.

The refractive index of the first layer was 1.598 and the film thickness was 85 nm. The refractive index of the second layer was 1.43 and the film thickness was 82 nm. The refractive index of the substrate layer (the undercoat layer) contiguous to the first layer was the same as that in Example 2, that is, 1.50.

(3) Preparation of Coating Composition for Second Layer:

(a) Preparation of Silane Hydrolyzate:

19.8 g of an aqueous 0.05N hydrochloric acid solution was added dropwise to 56.5 g of γ-glycidoxypropyltrimethoxysilane and 24.0 g of vinyltriethoxysilane with stirring while controlling the temperature to 10° C. After completion of the dropwise addition, the mixture was stirred for 1 hour at room temperature to obtain a silane hydrolyzate.

(b) Preparation of Coating Composition:

234 g of n-propanol, 98.4 g of water, 31.8 g of ethyl cellosolve, 36.7 g of the same colloidal silica dispersed in methanol as used in Example 1, 0.25 g of a silicone type surfactant and 1.1 g of aluminum acetylacetonate were added to 22.1 g of the above-mentioned silane hydrolyzate, and the mixture was sufficiently stirred to obtain a coating composition.

EXAMPLE 9

(1) Preparation of Coating Composition for First Layer:

9.9 g of the γ-glycidoxypropyltrimethoxysilane hydrolyzate prepared in (1)–(a) of Example 3 was mixed with 5.6 g of methanol, 76.2 g of benzyl alcohol and 0.6 g of aluminum acetylacetonate, and the mixture was sufficiently stirred to form a homogeneous solution. Then, 120 g of ethylene glycol, 122 g of n-propyl alcohol and 0.4 g of a silicone type surfactant were added to the above solution (liquid A). Separately, 23.5 g of colloidal titanium oxide sol dispersed in water (average particle diameter=about 50 nm, solid content=35.8%) was added to 33.5 g of ethylene glycol, 25.7 g of n-propyl alcohol and 22.1 g of acetylacetone with stirring (liquid B).

Then, 71.6 g of the liquid B was added to the above-mentioned liquid A, and the mixture was sufficiently stirred to form a coating composition.

(2) Preparation of Coating Composition for Second Layer:

(a) Preparation of Silane Hydrolyzate:

5.63 g of an aqueous 0.05N hydrochloric acid solution was added dropwise to a mixture of 6.7 g of γ-glycidoxypropyltrimethoxysilane, 4.35 g of γ-glycidoxypropylmethyldiethoxysilane and 12.24 g of vinyltriethoxysilane with stirring while controlling the temperature to 10° C., and after completion of the dropwise addition, the mixture was stirred at room temperature for 1 hour to obtain a silane hydrolyzate.

(b) Preparation of Coating Composition:

To 15.4 g of the above-mentioned silane hydrolyzate were added 2.2 g of an epoxy resin (trimethylolpropane polyglycidyl ether marketed under the tradename of "Denacol EX320" by Nagase Sangyo K.K.), 214.3 g of n-propyl alcohol, 90.2 g of water, 28.7 g of ethyl cellosolve, 0.2 g of a silicone type surfactant, 30.1 g of the same colloidal silica dispersed in methanol as used in Example 1 and 0.9 g of aluminum acetylacetonate with stirring, and the mixture was sufficiently stirred to form a coating composition.

(3) Coating and Curing:

A lens undercoated in the same manner as described in (2) of Example 2 was spin-coated with the coating composition for the first layer, described in (1) above, under the same conditions as described in Example 8, and the coated lens was heated for 1 hour in an air drying oven at 110° C. The first layer-coated lens was subjected to the same activating gas treatment as conducted for the first layer in Example 1, and the coating composition for the second coating, described in (2) above, was spin-coated on the coated lens under the same conditions as adopted for formation of the first coating layer. The coated lens was heated and cured at 110° C. for 1 hour.

(4) Test Results:

The luminous transmittance of the obtained lens was 98.0%, and the reflected light had a deep reddish violet color. At the abrasion test, no scratches were formed, and at the dyeing test, the lens was so densely dyed that the luminous transmittance was reduced to 25.0%. The antireflective effect after the dyeing test was not different from the antireflective effect before the dyeing test at all.

The refractive index of the first layer of the lens obtained in (3) above was 1.675 and the film thickness was 54 nm. The refractive index of the second layer was 1.40 and the film thickness was 80 nm. The refractive index of the substrate layer (the undercoat layer) contiguous to the first layer was the same as that in Example 2, that is, 1.50.

COMPARATIVE EXAMPLE 1

A sample comprising Plano lens CR-39 as a substrate and an antireflective coating of silicon monoxide and silicon dioxide formed on the substrate, which was prepared according to the teaching of Japanese Unexamined Patent Publication (KOKAI) No. 105249/78, was tested. It was found that the sample had no dyeability, and many cracks were observed on the antireflective coating of the processed lens.

COMPARATIVE EXAMPLE 2

A lens was prepared in the same manner as in Example 8 except that the second layer was not coated. The luminous transmittance of the lens was 90.0% and any antireflective effect could not be attained at all.

COMPARATIVE EXAMPLE 3

A lens was prepared in the same manner as in Example 8 except that the first layer was not coated but only the second layer was coated. The luminous transmittance of the lens was 92.9% and any antireflective effect could not be attained at all.

COMPARATIVE EXAMPLE 4

A lens was Prepared in the same manner as in Example 8 except that the second layer was first coated and the first layer was then coated. The luminous transmittance of the lens was 89.6%, and any antireflective effect could not be attained at all.

EXAMPLE 10

(1) Preparation of Coating Composition for First Layer

To 164.9 g of acetylacetone were added 17.2 g of tetra-n-butyl titanate, 20.0 g of colloidal silica dispersed in methanol (average particle diameter=12±1 nm, solid content=30%) and 0.11 g of a silicone type surfactant with stirring to obtain a coating composition.

(2) Preparation of Coating Composition for Second Layer:

A coating composition was prepared in the same manner as described in (1) above except that the amounts of the ingredients were changed as follows.

| | |
|---|---|
| Acetylacetone | 162.00 g |
| Tetra-n-butyl titanate | 30.20 g |
| Colloidal silica dispersed in methanol | 10.00 g |
| Silicone type surfactant | 0.11 g |

(3) Preparation of Coating Composition for Third Layer:

(a) Preparation of Silane Hydrolyzate:

19.8 g of an aqueous 0.05N hydrochloric acid solution was added dropwise to 56.5 g of γ-glycidoxypropyltrimethoxysilane, 24.0 g of vinyltriethoxysilane and 100.3 g of n-propyl alcohol with stirring while controlling the temperature to 10° C. After completion of the dropwise addition, the mixture was stirred at room temperature for 1 hour to obtain a silane hydrolyzate.

(b) Preparation of Coating Composition:

To 39.3 g of the above-mentioned silane hydrolyzate were added 150.5 g of n-propanol, 71.2 g of water, 23.9 g of ethyl cellosolve, 32.5 g of the same colloidal silica dispersed in methanol as used in (1) above, 0.22 g of a silicone type surfactant and 0.98 g of aluminum acetylacetonate with stirring, and the mixture was sufficiently stirred to obtain a coating composition.

(4) Coating and Curing:

A diethylene glycol bisallyl carbonate polymer lens (Plano lens CR-39, 75 mm in diameter and 2.1 mm in thickness), which had been dipped in an aqueous sodium hydroxide solution and then washed, was spin-coated with the coating composition for the first layer, prepared in (1) above, under conditions described below. The coated lens was heated and dried at 90° C. for 0.75 hour.

Spin-Coating Conditions:
Rotation number=3500 rpm
Rotation Time=60 seconds

Then, the heated lens was dipped in hot water at 40° C. for 1 hour, washed with water and dipped in acetone to remove water drops adhering to the surface. Then, the lens was heated and dried at 110° C. for 1 hour to form a first layer.

The coating composition for the second layer, prepared in (2) above, was spin-coated on the obtained first layer under the same conditions as adopted above for formation of the first layer, and the coated lens was subjected to the heat treatment and the hot water treatment in the same manner as described above with respect to formation of the first layer to obtain a second layer.

The coating composition for the third layer, prepared in (3) above, was spin-coated on the obtained second layer under the same conditions as adopted above for formation of the first layer except that the rotation time was changed to 30 seconds, and the coated lens was heated and cured for 2 hours in an air drying oven at 93° C.

(5) Test Results:

The luminous transmittance of the obtained lens was 95.2%, and the reflected light had a reddish violet color. The luminous transmittance of the uncoated CR-39 lens was 92.6%.

This antireflective lens was dyed at 90° C. for 45 minutes in a dyeing solution formed by dispersing and dissolving a mixture of red, blue and yellow disperse dyes in water. The lens was dyed to such an extent that the luminous transmittance was reduced to 60.8%. In this antireflective lens, the color of the reflected light after the dyeing operation was not different from the color of the reflected light before the dyeing operation.

The refractive indexes and film thicknesses of the first, second and third layers were as follows.

|              | Refractive Index | Film Thickness |
|--------------|------------------|----------------|
| First Layer  | 1.60             | 104 nm         |
| Second Layer | 1.71             | 92 nm          |
| Third Layer  | 1.48             | 90 nm          |

COMPARATIVE EXAMPLE 5

A coated lens was prepared in the same manner as described in Example 10 except that the positions of the first and second layers were reversed, that is, the coating composition for the second layer was first coated on the substrate and the coating composition for the first layer was then coated. The luminous transmittance of the obtained lens was 88.9%, and the lens had a reflection larger than that of the untreated CR-39 lens.

EXAMPLE 11

(1) Preparation of Antireflective Coating:

A lens which had been undercoated in the same manner as described in (2) of Example 2 was treated in the same manner as described in Example 10 to obtain an antireflective coating. The refractive indexes and film thicknesses of the first, second and third layers were the same as those in Example 10. The refractive index of the substrate layer (the undercoating layer) contiguous to the first layer was 1.50.

(2) Test Results:

The luminous transmittance of the obtained lens was 96.9%, and the reflected light of the lens had a yellowish green color. When the lens was dyed at 90° C. for 45 minutes in a dyeing solution prepared by dispersing and dissolving a mixture of red, blue and yellow disperse dyes into water. The lens was dyed to such an extent that the luminous transmittance was reduced to 22.3%. Before and after the dyeing operation, the abrasion resistance was tested by using steel wool #0000. In each case, no scratches were formed by the abrasion. The reflective photospectrum of the obtained lens was determined to obtain results shown in FIG. 1.

EXAMPLE 12

The Procedures of Example 10 were repeated in the same manner except that an inorganic glass lens was used as the transparent substrate.

The luminous transmittance of the obtained lens was 96.8%, and the reflected light of the obtained antireflective lens had a green color.

EXAMPLE 13

(1) Preparation of Coating Composition for First Layer:

To 358.5 g of acetylacetone was added 26.0 g of tetra-n-butyl titanate with stirring. Then, 20.0 g of colloidal silica dispersed in methanol (average particle diameter=12±1 nm, solid content=30%) and 0.135 g of a silicone type surfactant were added to the resulting liquid mixture to form a coating composition.

(2) Preparation of Coating Composition for Second Layer:

(a) Preparation of Silane Hydrolyzate:

5.4 g of an aqueous 0.01N hydrochloric acid solution was added dropwise at 10° C. to 23.6 g of γ-glycidoxy-propyltrimethoxysilane with stirring. After completion of the dropwise addition, the mixture was stirred at room temperature for 1 hour to obtain a silane hydrolyzate.

(b) Preparation of Coating Composition:

To 6.94 g of the silane hydrolyzate prepared in (a) above were added 260 g of n-propanol, 111 g of water and 32.0 g of ethyl cellosolve, and the mixture was sufficiently stirred. Then, 13.3 g of the same colloidal silica dispersed in methanol as used in (1) above and 0.4 g of aluminum acetylacetonate were added to the mixture. The resulting mixture was sufficiently stirred to obtain a coating composition.

(3) Coating and Curing:

A filter of a Braun tube, which was used to reduce flickering of the picture, composed of a polymethyl methacrylate cast sheet colored into an amber color was washed with water and a detergent and then dip-coated with the above-mentioned coating composition for the first layer at a pull-up speed of 10 cm/min. The coated filter was heated for 60 minutes in an air drying oven at 93° C. and dipped in hot water at 50° C. for 60 minutes. Water drops were removed by nitrogen blowing and the filter was heated and dried at 93° C. for 60 minutes. Then, the coating composition for the second layer was dip-coated on the obtained first layer in the same manner as adopted above for formation of the first layer, and the coated filter was heated and cured for 2 hours in an air drying oven at 93° C.

(4) Test Results:

The luminous transmittance of the obtained polymethyl methacrylate filter was 42.6% and the reflected rays were drastically reduced. The luminous transmittance of the uncoated polymethyl methacrylate cast sheet was 41.5%. The refractive index of the first layer was 1.76 and the film thickness was 43 nm. The refractive index of the second layer was 1.43 and the film thickness was 92 nm.

Incidentally, the refractive index of the substrate layer (polymethyl methacrylate cast sheet) contiguous to the first layer was 1.49.

EXAMPLE 14

The procedures of Example 13 were repeated in the same manner except that a polymethyl methacrylate filter which had been undercoated in the same manner as described in (2) of Example 6 was used.

(1) Test Results:

The luminous transmittance of the obtained polymethyl methacrylate filter was 43.9%, and the antireflective effect was so high that no substantial reflection was observed. When the abrasion resistance of the obtained filter was examined by using steel wool #0000, it was found that scratches were hardly formed by the abrasion.

When the obtained filter was attached to a computer and the picture-reading test was carried out, it was found that flickering of the picture was drastically reduced and exterior light rays were hardly reflected on the picture. Thus, it was confirmed that a display device not substantially fatiguing eyes was provided.

EXAMPLE 15

(1) Preparation of Coating Composition for First Layer:

To 168.6 g of acetylacetone were added 0.10 g of a silicone type surfactant and 18.0 g of colloidal silica dispersed in methanol (average particle diameter=12±1 nm, solid content=30%) with stirring. The mixture was sufficiently stirred and 15.5 g of tetra-n-butyl titanate was added, and the resulting mixture was sufficiently stirred to form a coating composition.

(2) Preparation of Coating Composition for Second Layer:

(a) Preparation of Silane Hydrolyzate:

19.8 g of an aqueous 0.05N hydrochloric acid solution was added dropwise to 56.5 g of γ-glycidoxypropyl-trimethoxysilane and 24.0 g of vinyltriethoxysilane with stirring while controlling the temperature to 10° C. After completion of the dropwise addition, the mixture was stirred at room temperature for 1 hour to obtain a silane hydrolyzate.

(b) Preparation of Coating Composition:

To 39.3 g of the above-mentioned silane hydrolyzate were added 150.5 g of n-propanol, 71.2 g of water, 23.9 g of ethyl cellosolve, 32.5 g of the same colloidal silica dispersed in methanol as used in Example 1, 0.22 g of a silicone type surfactant and 0.98 g of aluminum acetylacetonate, and the mixture was sufficiently stirred to obtain a coating composition.

(3) Coating and Curing:

A diethylene glycol bisallyl carbonate polymer lens (Plano lens CR-39, 75 mm in diameter and 2.1 mm in thickness), which had been dipped in an aqueous sodium hydroxide solution and then washed, was spin-coated with the coating composition prepared in (1) above under conditions described below. The coated lens was heated and dried at 90° C. for 1 hour.

Spin-Coating Conditions:
Rotation number=3500 rpm
Rotation time=60 seconds

The heated lens was dipped in hot water maintained at 40° C. for 1 hour and was then heated and dried at 110° C. for 1 hour.

The coating composition for the second layer, prepared in (2)-(b) above, was spin-coated on the obtained first layer under the same conditions as adopted for formation of the first layer, and the coated lens was heated and cured for 2 hours in an air drying oven at 93° C.

(4) Test Reuslts:

The luminous transmittance of the obtained lens was 96.7%, and the reflected light of the obtained antireflective lens had a reddish violet color. The luminous transmittance of the lens before the above-mentioned antireflective treatment was 92.6%. The antireflective lens was dyed at 90° C. for 30 minutes in a dyeing solution obtained by dispersing and dissolving a mixture of red, blue and yellow disperse dyes in water. The lens was dyed to such an extent that the luminous transmittance was reduced to 40.6%. The antireflective effect was not reduced by the dyeing treatment at all.

EXAMPLE 16

The procedures of Example 15 were repeated in the same manner except that a lens which had been undercoated in the same manner as described in (2) of Example 2 was used as the substrate.

The luminous transmittance of the obtained lens was 96.2%. The reflected light had a reddish violet color. When the abrasion resistance of the obtained lens was examined by using steel wool #0000, it was found that scratches were hardly formed by the abrasion. This antireflective lens was dyed at 90° C. for 30 minutes in a dyeing solution obtained by dispersing and dissolving a mixture of red, blue and yellow disperse dyes in water. The lens was dyed to such an extent that the luminous transmittance was reduced to 54.9%. The antireflective effect was not reduced by the dyeing treatment at all.

The luminous transmittance of the undercoated lens which was not subjected to the above antireflective treatment was 92.78%.

Figure 2:
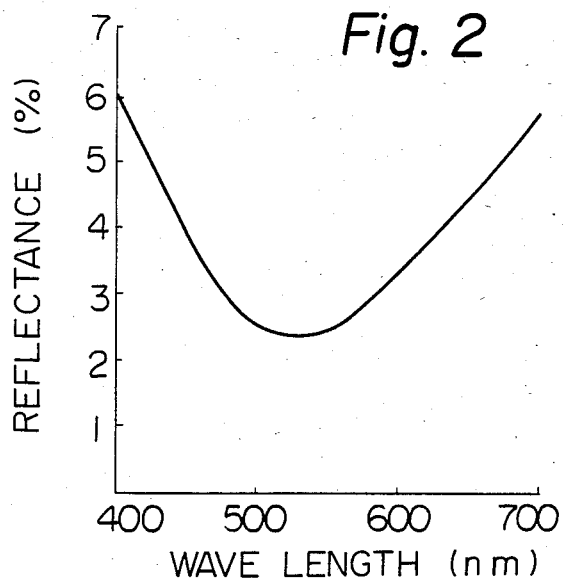
FIG. 2 is a graph showing the reflective photospectrum of an antireflective lens having a magenta reflected light color according to another embodiment of the present invention.

The reflective photospectrum of the obtained antireflective lens was determined to obtain results shown in FIG. 2.

COMPARATIVE EXAMPLE 6

An antireflective lens was prepared in the same manner as described in Example 16 except that the undercoated lens was dyed with a red dye prior to the antireflective treatment. Dissolution of the red dye into the coating composition for the first layer was observed, and the coating composition became red.

EXAMPLE 17

The procedures of Example 16 were repeated in the same manner except that the lens used was changed to a diethylene glycol bisallyl carbonate polymer lens of −4.00 diopters.

The obtained antireflective lens had the same properties as those of the antireflective lens obtained in Example 16.

EXAMPLE 18

The procedures of Example 16 were repeated in the same manner except that the lens used was changed to a diethylene glycol bisallyl carbonate polymer lens of +2.00 diopters.

The obtained antireflective lens had the properties as those of the antireflective lens obtained in Example 16.

EXAMPLE 19

The procedures of Example 16 were repeated in the same manner except that the lens used was changed to an inorganic glass lens (65 mm in diameter and 2.0 mm in thickness).

The luminous transmittance of the obtained antireflective lens was 94.8%. The obtained lens was dyed in the same manner as in Example 16 except that the dyeing time was changed to 3 hours. The lens was dyed to such an extent that the luminous transmittance was reduced to 70.0%. Incidentally, the luminous transmittance of the untreated lens was 91.9%.

We claim:

1. A transparent material having an antireflective coating, at least one surface of which has a haze value of not more than 80%, the antireflective coating comprising at least two layers each cured on at least a part of the surface of a transparent substrate, said layers comprising an inner layer containing a compound of a metal selected from the group consisting of Ti, Al and Zr, and an outer layer containing an organic silicon compound, wherein the thickness and the refractive index of the layer contiguous to the substrate and the thickness and the refractive index of the outermost layer satisfy the following requirements:

$$\tfrac{l}{4} \lambda \times 0.7 < n_I d_I < \tfrac{l}{4} \lambda \times 1.3,$$

and $$\tfrac{m}{4} \lambda \times 0.7 < n_O d_O < \tfrac{m}{4} \lambda \times 1.3,$$

wherein $n_I$ represents the refractive index of the layer contiguous to the substrate, $n_O$ represents the refractive index of the outermost layer, $d_I$ represents the film thickness (in nm) of the layer contiguous to the substrate, $d_O$ represents the film thickness (in nm) of the outermost layer, $l$ is a positive integer, $m$ is an odd positive integer, and $\lambda$ stands for an optional standard wavelength (in nm) selected within the visible ray wavelength region or in the vicinity thereof, and $n_I > n_O$ and $n_I > n_S$ wherein $n_S$ represents the refractive index of the substrate, the composition for forming the cured layer contiguous to the substrate comprising at least 10% by weight as the metal oxide equivalent weight, based on the weight of the layer-forming coating components, of at least one member selected from the group consisting of alkoxides and acylates of titanium, aluminum and zirconium having 1 to 12 carbon atoms, chelate compounds of said metals and dispersed phases in liquid of oxides of said metals, and not more than 90% by weight, based on the weight of the layer-forming coated components, of a material selected from the group consisting of organic resins and inorganic fine particles; and the composition for forming the cured outermost layer comprising at least 20% by weight as the solid content equivalent weight based on the weight of the layer-forming coating components, of at least one compound selected from the group consisting of an organic silicon compound represented by the following general formula:

$$R^1{}_a R^2{}_b Si(OR)_{4-a-b}$$

wherein $R^1$ and $R^2$ independently stand for a hydrocarbon group having 1 to 10 carbon atoms, containing an alkyl, alkenyl, aryl, halogeno, epoxy, amino, mercapto, methacryloxy or cyano group, R stands for an alkyl, alkoxyalkyl or acyl group having 1 to 8 carbon atoms, a and b are 0 or 1, and the sum of a and b is 1 or 2, and a hydrolyzed product of said organic silicon compound and not more than 80% by weight, based on the weight of the layer-forming coating components, of a material selected from the group consisting of organic resins and inorganic fine particles.

2. A transparent material as set forth in claim 1, wherein the antireflective coating has two layers.

3. A transparent material as set forth in claim 1, wherein the antireflective coating has three layers, the refractive index and film thickness of an intermediate layer interposed between the layer contiguous to the substrate and the outermost layer satisfy the following requirements:

$$\tfrac{n}{4} \lambda \times 0.7 < n_M d_M < \tfrac{n}{4} \lambda \times 1.3, \text{ and}$$

$$n_S < n_I < n_M$$

wherein $n_M$ represents the refractive index of the intermediate layer, $d_M$ represents the film thickness (in nm) of the intermediate layer, and n is a positive integer.

4. A transparent material as set forth in claim 3, wherein the composition for forming the intermediate layer comprises at least one member selected from the group consisting of alkoxides, acylates, chelate compounds and dispersed phases in liquid of oxides of titanium, aluminum and zirconium, in an amount of at least 10% by weight as the metal oxide equivalent weight, based on the weight of the layer-forming coating components of the layer-forming coating components, 5. A transparent material as set forth in any of claims 1 through 4, wherein the transparent substrate is a transparent plastic article.

6. A transparent material as set forth in claim 5, wherein the plastic article is covered with a dyeable, highly hardened coating film.

7. A transparent material as set forth in claim 5, wherein the plastic article is composed of a diethylene glycol bisallyl carbonate polymer.

8. A transparent material as set forth in claim 5 wherein the plastic article is composed of polymethyl methacrylate.

9. A transparent material as set forth in any of claims 1 through 4, wherein the transparent substrate is a glass article.

10. A transparent material as set forth in claim 9, wherein the glass article is covered with a dyeable, highly hardened coating film.

11. A transparent material as set forth in any of claims 1 through 3, wherein the transparent substrate is colored by dyeing.

12. A transparent material as set forth in any of claims 1 through 3, wherein the transparent substrate is a lens.

13. A transparent material as set forth in any of claims 1 through 3, wherein the transparent substrate is a display plate or display filter.

14. A transparent material as set forth in claim 1, wherein at least one of $R^1$ and $R^2$ is a hydrocarbon group containing an epoxy group.

15. A transparent material as set forth in any of claims 1, 2 or 3, wherein at least one layer of the antireflective coating contains colloidal silica.

* * * * *

UNITED STATES PATENT AND TRADEMARK OFFICE
CERTIFICATE OF CORRECTION

PATENT NO. : 4,590,117

DATED : May 20, 1986

INVENTOR(S) : Takashi Taniguchi et al

It is certified that error appears in the above-identified patent and that said Letters Patent is hereby corrected as shown below:

Column 23, line 30, delete "coated" and insert therefor --coating--.

Signed and Sealed this

Twenty-eighth Day of April, 1992

*Attest:*

HARRY F. MANBECK, JR.

*Attesting Officer*      *Commissioner of Patents and Trademarks*